United States Patent
Gunther

(10) Patent No.: US 11,143,834 B2
(45) Date of Patent: Oct. 12, 2021

(54) MICRODUCT PULLING CAP DEVICE

(71) Applicant: Gunther Line LLC, Edgerton, KS (US)

(72) Inventor: Todd Gunther, Edgerton, KS (US)

(73) Assignee: Gunther Line LLC, Edgerton, KS (US)

( * ) Notice: Subject to any disclaimer, the term of this patent is extended or adjusted under 35 U.S.C. 154(b) by 0 days.

(21) Appl. No.: 16/946,365

(22) Filed: Jun. 18, 2020

(65) Prior Publication Data

US 2020/0400909 A1   Dec. 24, 2020

Related U.S. Application Data

(60) Provisional application No. 62/864,609, filed on Jun. 21, 2019.

(51) Int. Cl.
| | |
|---|---|
| *G02B 6/00* | (2006.01) |
| *G02B 6/44* | (2006.01) |
| *G02B 6/54* | (2006.01) |
| *H02G 1/08* | (2006.01) |

(52) U.S. Cl.
CPC ......... *G02B 6/4463* (2013.01); *G02B 6/4465* (2013.01); *G02B 6/54* (2013.01); *H02G 1/081* (2013.01)

(58) Field of Classification Search
CPC ...... G02B 6/4463; G02B 6/54; G02B 6/4465; H02G 1/081
See application file for complete search history.

(56) References Cited

U.S. PATENT DOCUMENTS

| | | | | |
|---|---|---|---|---|
| 4,101,114 A | * | 7/1978 | Martin | H02G 1/081 254/134.3 FT |
| 4,432,663 A | * | 2/1984 | Lasak | F16G 11/05 174/79 |
| 6,104,855 A | * | 8/2000 | Jeon | G02B 6/3849 385/139 |

(Continued)

OTHER PUBLICATIONS

Comstar Supply, Inc., "Fiber Optic Cable Pulling Grips." Accessed at https://www.comstarsupply.com/cable-pulling/pulling-grips/fiber-optic-cable-pulling-grips.html on Sep. 2, 2020; 2 pages.

(Continued)

*Primary Examiner* — Ellen E Kim
(74) *Attorney, Agent, or Firm* — Husch Blackwell LLP

(57) ABSTRACT

A system and method for improving the efficiency and effectiveness of installing and pulling microducts through subterranean pathways is provided. The system includes a device that is placed over at least one microduct and secured through tapered screws that enter through the end cap of the body of the device and into at least one microduct. The tapered screw both expands the microduct, pressing it against the inner wall of the body and guide rod, as well as securing the microduct to the cap end of the body. Securing the microducts against seal provides further protection from water, debris, and other contaminants, and the expansion of the microducts provides friction and adherence to the body, aiding in keeping microducts in place. The device further includes a pulling apparatus connected to the device body, allowing it to be connected to a pulling mechanism for installation of the microducts.

15 Claims, 6 Drawing Sheets

(56) References Cited

U.S. PATENT DOCUMENTS

| | | | | |
|---|---|---|---|---|
| 6,979,776 B1* | 12/2005 | Zimmermann | .......... | H02G 1/06 |
| | | | | 138/111 |
| 7,478,794 B1* | 1/2009 | Gohlke | .................... | B66C 1/42 |
| | | | | 254/134.3 FT |
| 9,027,908 B1* | 5/2015 | Calhoun | ................. | F16G 11/02 |
| | | | | 254/134.3 R |
| 9,711,956 B1* | 7/2017 | Welch | .................... | H02G 1/085 |
| 2010/0102286 A1* | 4/2010 | Jordan | ................... | H02G 1/081 |
| | | | | 254/134.3 PA |
| 2010/0297285 A1* | 11/2010 | Chen | ................... | B21D 41/021 |
| | | | | 425/505 |
| 2014/0110648 A1* | 4/2014 | Williamson | ........... | H02G 1/081 |
| | | | | 254/134.3 R |
| 2019/0067920 A1* | 2/2019 | Kim | ........................ | H02G 9/00 |

OTHER PUBLICATIONS

Comstar Supply, Inc., "Innerduct Eyes for Micro Duct." Accessed at https://www.comstarsupply.com/cable-blowing/cable-blowing-accessories/innerduct-eyes-for-micro-duct.html on Sep. 2, 2020; 1 page.

* cited by examiner

MICRODUCT PULLING CAP DEVICE

CROSS-REFERENCE TO RELATED APPLICATIONS

This application claims priority to U.S. Provisional Patent Application Ser. No. 62/864,609, filed on Jun. 21, 2019, to Todd Gunther, entitled "Microduct Pulling Device," the entire disclosure of which is incorporated herein by reference.

FIELD OF THE INVENTION

The present invention is generally directed to a system and method for improving the efficiency and effectiveness of installing and pulling microducts through subterranean pathways.

BACKGROUND

A microduct bundle is a bundle of small diameter ducts that are configured for accommodating cables or lines, such as fiber optic cables, which are often used for telecommunication, data transmission, and computer networking purposes. As demonstrated in FIGS. 1A-1G, known microduct bundles may include one, two, three, four, five or more internal microducts and may be of any suitable configuration. As shown, the typical microduct bundle 2 includes an outer sheath or jacket 4 surrounding the smaller internal conduits or microducts 6 which may encompass lines or cables 8, such as fiber optics cables.

Challenges often arise during the installation of microducts, as there are rarely straight surface pathways. Oftentimes, installers use a directional drill or bore, auger bore, or other means, to drill underground pathways to install microducts under roads, bridges, waterways, and other infrastructure. When this occurs, a drilling device bores a pathway in the ground. After the drilling device drills the pathway, the device can then be connected to the microduct(s), and both the device and microduct(s) are pulled back through the drilled hole.

These underground pathways have inherent challenges that reduce the efficiency of installing microducts and expose fragile and expensive microducts and fiber optic cables to contaminants in the ground, such as mud, water, dirt, rocks, and other contaminants. If directly exposed to such contaminants, the exposed portions of the microducts must be removed or cleaned, adding costs to time, labor, and materials.

There are currently two known primary types of microduct pulling products, both of which include shortcomings. One such product is a metal mesh product which wraps around a bundle of uncovered microducts. This metal mesh wraps around the microduct fibers and then is secured using tape or other adhesive methods. The length of the metal mesh is long enough to extend past the front end of the microducts, and to be able to loop back around, creating an area that a pulling device can grab on to. As a pulling force is applied, the metal mesh will constrict in diameter and tighten against the microduct, allowing the microducts to be pulled through an underground pathway.

However, the metal mesh method of microduct pulling is flawed in its reliance on tape or other adhesive materials to keep the metal mesh secured to the microduct fibers. This method of fastening is inefficient, and lacks the security of other fastening methods. In areas with obstacles and high friction, the metal mesh fastening method is prone to dislodging and stranding the microducts in difficult to reach areas underground. Further, when exposed to a wet environment, which may occur often, the moisture can cause the adhesive materials to weaken and dissolve.

Additionally, the metal mesh method of microduct pulling is prone to exposing the delicate and expensive microduct fibers to mud, water, dirt, rocks and other contaminants in the ground. By its very nature, the metal mesh covering has openings that expose the microducts directly to the contaminants in the ground. Because of these openings in the metal mesh covering, mud and other contaminants can enter the microducts through the exposed openings. When this occurs, the contaminated portions of the microducts must be cut and removed or cleaned, creating unnecessary waste of material, time, and expense.

Further, the metal mesh cover product was not designed, and is not effective, for pulling microducts that have a protective layer surrounding them. As described above, in certain circumstances, microducts 6 will be encapsulated by a protective outer jacket 4 for protection and stability. This protective jacket 4, while adding stability and protection to the microducts 6, also adds considerable size to the microduct bundle 2. As such, there is an inherent design flaw when mesh covers are used in an attempt to pull microducts in the protective cover.

Finally, the metal mesh product frequently wears out from abrasion caused when being pulled through underground applications. This wearing down causes tears to the mesh metal product causing limited uses and frequent replacement, creating unnecessary waste of time and material.

The second type of microduct pulling device that is currently known and on the market comprises individual pulling eyes connected by a lanyard wire to a central pulling wire. Like the metal mesh, the pulling eye device is not without its own flaws. Similar to the metal mesh pulling device, the pulling eye is not designed for microducts that are pre-covered in a protective jacket. The pulling eye was designed to pull unbound microducts, which are more flexible than microducts in a protective jacket. When applied to pre-covered microducts, these individual pulling eyes are placed in a condition that applies non-optimal pressure because of a stricter movement pattern and the angle of connection.

Additionally, in order to pull more than one microduct at a time, each individual microduct must have its own pulling eye. Installing a pulling eye to each individual microduct requires considerable time and material. Even with microduct bundles that are bound by a protective jacket, each microduct must still have a pulling eye. While the bound microduct bundles could theoretically be pulled without a pulling eye in each microduct, the microducts that are not covered by a pulling eye are being directly exposed to water, mud, and other contaminants.

Further, the individual pulling eye system has an inherent weakness in pulling multiple microducts even when each microduct has a pulling eye. If even one pulling eye breaks or fails, the entire system is compromised. If a pulling eye is removed from a microduct, that microduct is then exposed to water, mud, and other contaminants. Further, should a pulling eye break or fail, more force will be applied to the rest of the pulling eyes, increasing the chance for more pulling eyes to break or fail. Because force is applied to each individual eye, there are multiple points of failure for compromise, with only one point of failure needed to compromise the system.

Finally, because a pulling eye must be connected to each individual microduct, significant time and labor is needed for installation and removing the pulling eyes when the installation is finished. This creates an unnecessary and inefficient waste of time and labor.

Accordingly, a need exists for a pulling device that provides a stable pulling process for multiple, protected and unprotected microducts. A need also exists for a pulling device that provides long-term consistent performance without sacrificing efficiency and effectiveness. An additional need exists for a microduct pulling system or device that consistently protects expensive and fragile microducts and the fibers therein from contaminants. A further need exists for a reliable microduct pulling system or device that reduces human labor without sacrificing performance.

SUMMARY OF THE INVENTION

A system and method for the installation of cables or conduits, such as microducts, through a subterranean pathway is provided. The system includes a device including a hollow body having an interior wall defining an interior void space for accommodating at least one conduit therein. The hollow body can act as a protective cover and be placed around the end of a bundle of microducts, with or without a jacket, using an open end of the device. The body can comprise, an open end, a generally closed opposing end, and one or more holes defined through the closed end for receiving fastening components therethrough. Alignment of the device with a microduct bundle may be aided through the use of an interior guide rod extending down from the top cap of the body. The guide rod may engage or be received within one of the conduits or microducts included in the bundle. Fastening components are used to secure the device to a conduction or microduct bundle. The fastening components (e.g., carrot screws, carrot pullers, etc.) can include a tapered shaft having ridges, protrusions, indentions, grooves and/or threads that engage the inner surface of a conduit or microduct. The tapered design of the fastening components further causes the conduit or microduct to expand and engage with the interior wall of the body creating a gripping effect. This gripping effect can be further enhanced through use of ridges, protrusions, indentions, grooves, threads, or other surface textures of the interior wall. The fastening component may engage the conduit or microduct and at least partially secure it within the interior void space of the body. The device may further include a seal member adapted for placement within the void space of the body between a free end of the conduits and the closed end of the body. The fastening components may pull the conduits against the seal member, thereby further securing the conduits in place within the body.

The method can include providing a pulling device, as described above, engaging at least one of conduit with at least one fastening component in order to secure the conduit at least partially within the interior void space of the body. The device may then be coupled to a pulling machine (e.g., a direction bore machine) and pulled though a subterranean pathway. The present system and method may be adapted to multiple configurations and sizes of microducts, including individual conduits, individual microducts, or multiple conduits or microducts located in a bundle with a protective sheath or jacket. The shape and size of the hollow body can be adapted to fit the size and configuration of the desired microduct configuration. Such examples of microduct configuration the system is compatible with include, but are not limited to 2-way, 3-way, 4-way, 5-way, 6-way, and 7-way microduct bundles.

Other objects and features will be in part apparent and in part pointed out hereinafter.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DESCRIPTION OF THE INVENTION

Figure 1A:
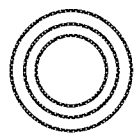
FIG. 1A is a schematic end view of a 1-way microduct bundle configuration currently known in the art.
Figure 1B:
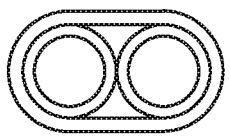
FIG. 1B is a schematic end view of a 2-way microduct bundle configuration currently known in the art.
Figure 1C:
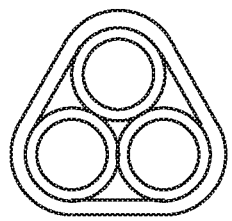
FIG. 1C is a schematic end view of a 3-way microduct bundle configuration currently known in the art.
Figure 1D:
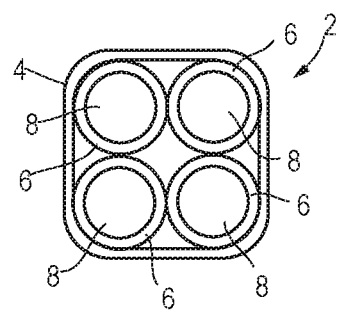
FIG. 1D is a schematic end view of a 4-way microduct bundle configuration currently known in the art.
Figure 1E:
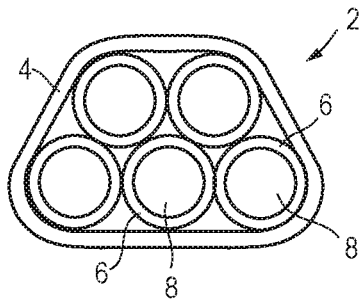
FIG. 1E is a schematic end view of a 5-way microduct bundle configuration currently known in the art.
Figure 1F:
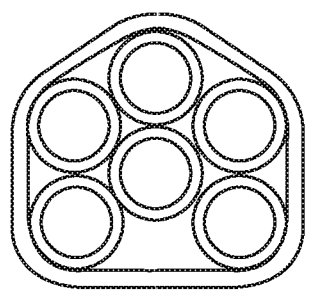
FIG. 1F is a schematic end view of a 6-way microduct bundle configuration currently known in the art.
Figure 1G:
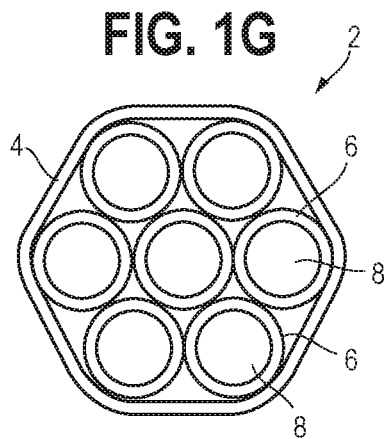
FIG. 1G is a schematic end view of a 7-way microduct bundle configuration currently known in the art.

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be appreciated that any dimensions included in the drawing figures are simply provided as examples and dimensions other than those provided therein are also within the scope of the invention.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed generally to a pulling device 10 designed to pull cables, conduits, microducts 6 and the like through a subterranean pathway. This pulling device 10 is designed to both protect fragile microducts 6 while simultaneously increasing efficiency in pulling the microducts 6 through an underground passage. This pulling device 10 can also decrease the amount of material and labor time spent in installation.

Figure 2:
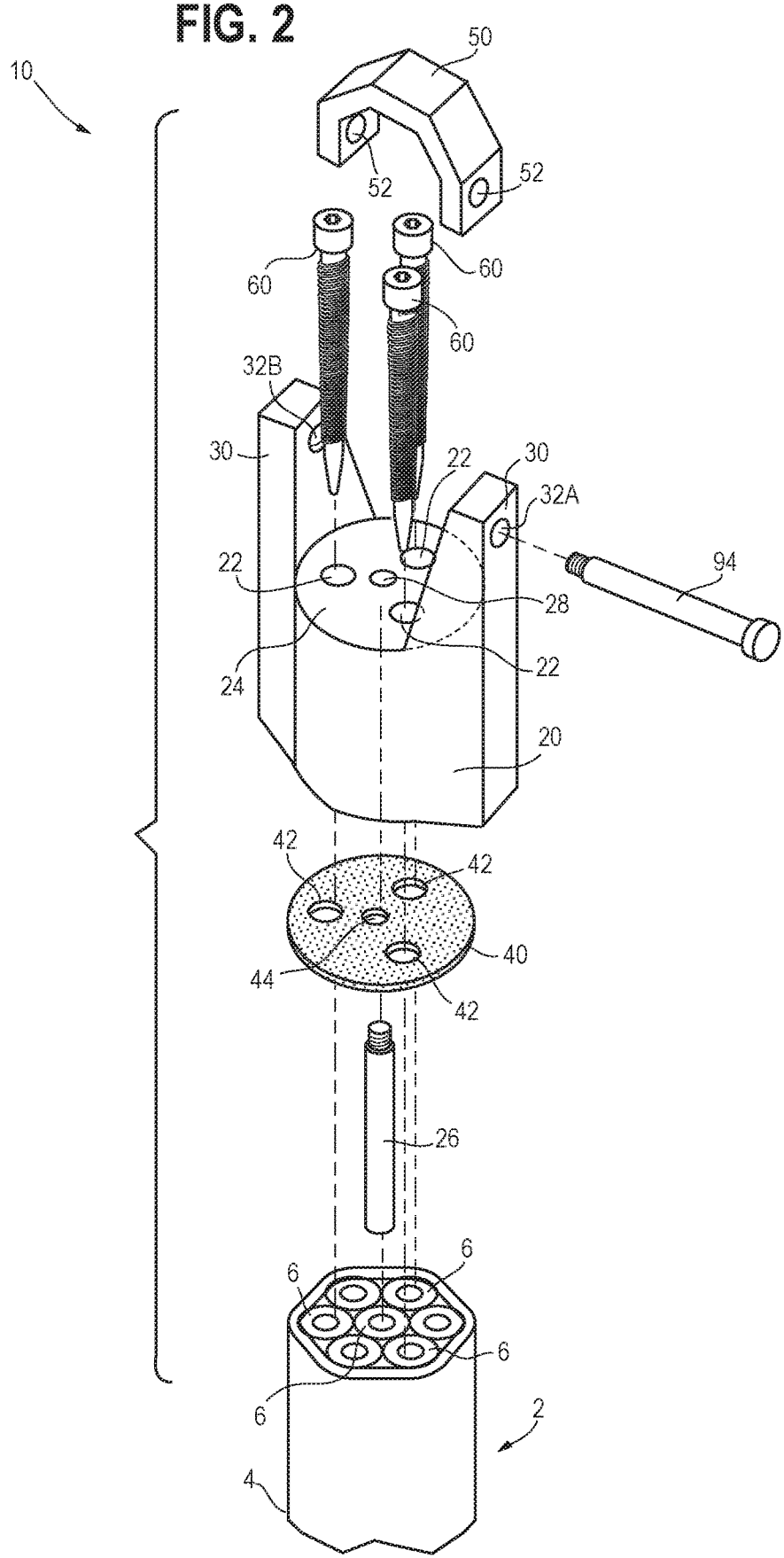
FIG. 2 is an exploded view of a pulling device for use with a 7-way microduct bundle in accordance with one embodiment of the present invention.
Figure 3:
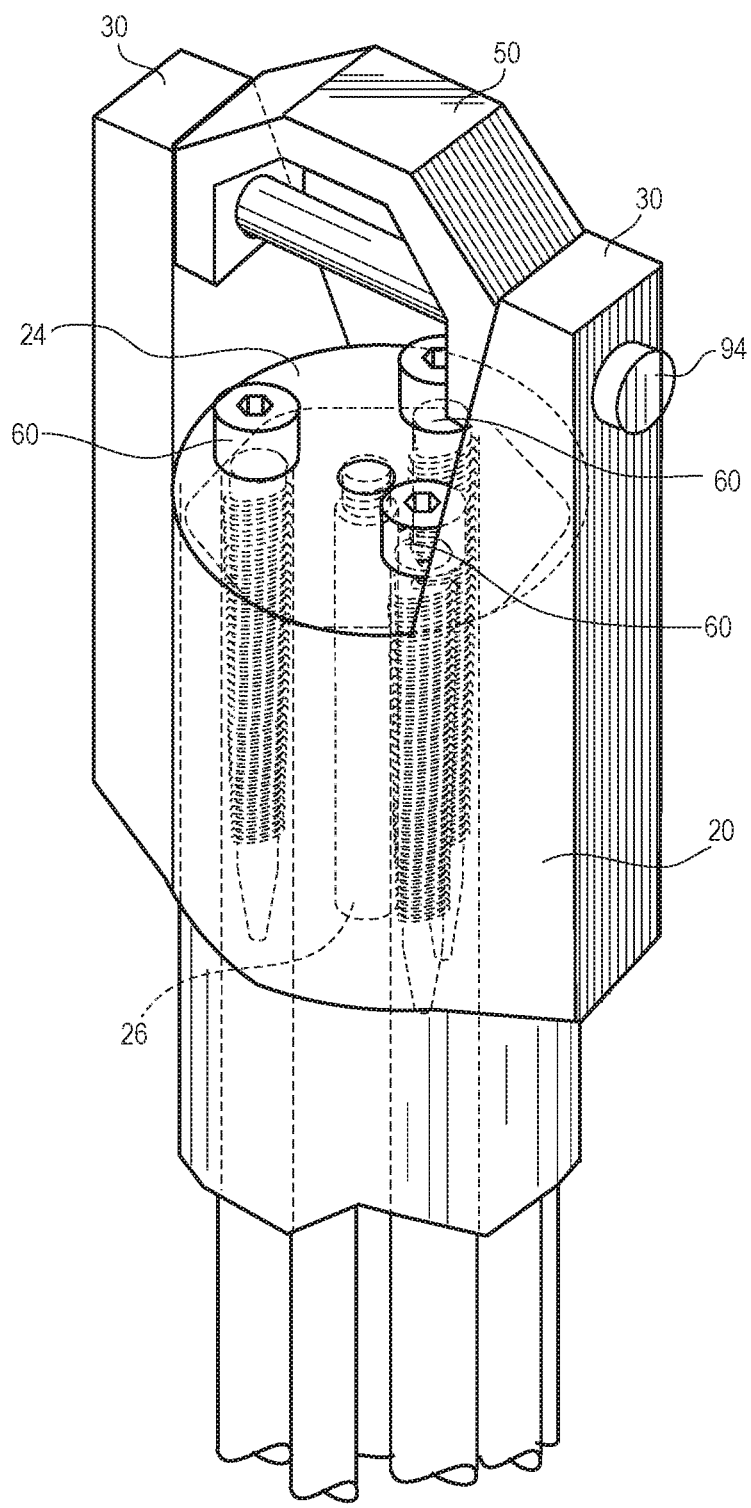
FIG. 3 is a side perspective view of the pulling device for use with a 7-way microduct bundle in accordance with one embodiment of the present invention.

As demonstrated in FIGS. 2 and 3, the pulling device 10 comprises several components that may be connected together to create one unit. While comprising several features and components that may aid in increasing efficiency and effectiveness, the pulling device 10 chiefly comprises a pulling cap body 20 and at least one fastener for coupling to at least one microduct 6.

Figure 4:
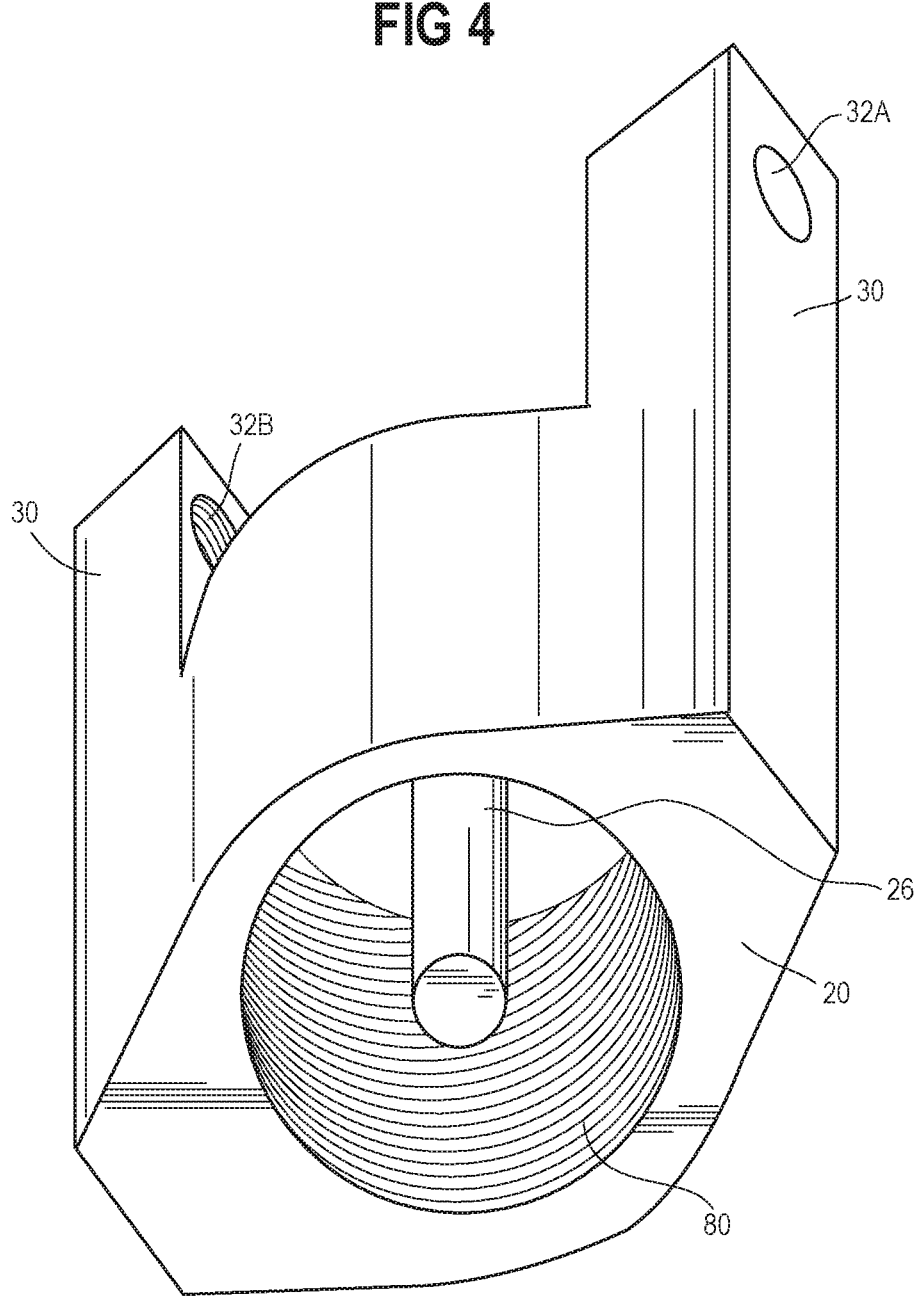
FIG. 4 is bottom perspective view of the pulling cap body in accordance with one embodiment of the present invention.

As illustrated in FIGS. 2-4, pulling cap body 20 can be placed over the end of one or more microducts 6, whether the microducts 6 are uncovered or covered with an outer jacket 4. Pulling cap body 20 may comprise a generally hollow interior or void space defined by an inner wall 80. As generally demonstrated in FIG. 4, inner wall 80 of pulling cap body 20 may include threads, ridges, projections, indentions, or other surface texture or structures.

As generally illustrated in FIG. 4, pulling cap body 20 comprises one open end, configured for receiving at least one microduct 6 therethrough, and one opposing generally closed or solid end. This closed end of the cap end 24, can have the same general diameter as the rest of pulling cap body 20, which again, may vary depending on the embodiment. Cap end 24 covers and protects microducts 6 inside pulling cap body 20 from exposure to mud, water, dirt, rocks, and other containments, as well as provides a contact point between pulling cap body 20 and microducts 6.

Cap end 24 may also comprise at least one opening, hole, or "carrot opening" 22 defined therethrough, the size of which may vary based on the embodiment. Opening 22 can generally be sized and adapted for use with commonly known microduct 6 sizes, and can vary based on the embodiment. For example, opening 22 can be designed to fit microducts 6 having diameters of 10 mm, 12 mm, 14 mm, or any other desired size. Further, in alternate embodiments, cap end 24 may comprise more than one opening 22. Placement of opening 22 may vary based on the embodiment, but may generally be positioned so that it may be aligned with at least one microduct 6 placed inside pulling cap body 20.

In one embodiment as depicted in FIGS. 2-4, pulling cap body 20 may have a diameter of approximately 57 mm, for example, in order to be adapted for use with a commonly-known 7-way microduct bundle products. However, in other embodiments, pulling cap body 20 may have a smaller or larger diameter or width depending on the size and configuration of the microducts and/or the number of microducts 6 in the bundle. Further, pulling cap body 20 may be constructed from any suitable material including, but not limited to, plastic, aluminum, hardened steel, heat dipped steel, or other suitable materials. Even further, the thickness of pulling cap body 20 may vary depending on the embodiment but may be anywhere from 7 mm to 4 inches thick for example, or any other suitable thickness.

To secure microduct(s) 6 to the pulling cap body 20, fasteners, grippers, or other coupling devices may be utilized. In the illustrated embodiment, a fastening component, such as a screw, "carrot," or "carrot screw" 60 may be used to couple at least one microduct 6 to pulling cap body 20, but it will be appreciated that other coupling devices known in the art could alternatively be used. As depicted in FIGS. 2 and 3, carrot screw 60 may have a tapered stem or shaft that gradually decreases in diameter from its head to a distal end, or a partially tapered stem or shaft at the tip of the stem, for example the last 10 mm. The shaft or tapered shaft may include ridges, protrusions, or threads formed thereon or may have grooves or other indentions defined therein. As further illustrated in FIGS. 2 and 3, the threads of carrot screw 60 can have a buttress threads or be of a similar profile in order to bite or otherwise engage the interior sidewall surface of the microduct conduits. Such carrot screws 60 may sometimes be referred to interchangeably as "carrots," "pulling carrots," "carrot pullers," "screw-in pullers," "towing carrots," and "carrot screws." In one embodiment, carrot screw 60 may have an Allen head, Torx head, hex head, or another other type of suitable head currently known or hereafter developed.

As illustrated in FIGS. 2 and 3, pulling cap body 20 may be placed over the end of one or more microduct 6, wherein pulling cap body 20 can act as a sleeve, cap, or cover to microduct 6. To secure pulling cap body 20 to microduct 6, microduct 6 may be aligned with opening 22 in cap end 24. Carrot screw 60 may then be inserted into opening 22, passing through cap end 24 until inserting into microduct 6, starting with the narrow distal end of the carrot screw 60. As carrot screw 60 threads into microduct 6, microduct 6 is pulled closer to the cap end 24 until it is pressed against cap end 24. By pressing against cap end 24, water, debris, and other contaminants are prevented from entering microduct 6.

When inserted into microduct 6, carrot screw 60 provides increased stability and security of the microducts 6 in addition to pressing microduct 6 against cap end 24. Additionally, the design of carrot screw 60 may cause microduct 6 to expand. When microduct 6 expands, the outer surface of microduct 6 may engage with inner wall 80 of pulling cap body 20. The textured surface of inner wall 80 can provide additional friction, security, and stability of pulling cap body 20 when connected to microduct 6. In that regard, the surface of inner wall 80 may include ridges, protrusions, or threads formed thereon or may have grooves or other indentions defined therein. This is particularly advantageous during installation of microduct 6, and helps prevent microduct pulling cap device 10 and microduct 6 from decoupling.

When pulling cap body 20 is coupled to microduct 6, pulling device 10 may then be connected to a drilling or pulling device (not shown) for installing the microduct 6. Pulling device 10 may be connected to any suitable pulling device or drilling device currently known or hereafter developed.

It will be appreciated that pulling device 10 may be adapted for use with a plurality of microduct configurations, depending on the embodiment. For example, pulling device 10 may be used with microduct configurations comprising an outer jacket or sleeve 4. Additionally, pulling device 10 may be used with microduct configurations comprising a plurality of microducts 6. Non-limiting examples of such microduct configurations include but are not limited to, microduct bundles 2 having a configuration of one, two, three, four, five, six, and seven or more microducts 6. Such configurations are depicted in FIGS. 1A-1G. Further, pulling cap body 20 may be configured in any cross-sectional shape, including but not limited to, round, square, rectangular, octagonal, triangular, polygonal, or any other suitable shape. Pulling cap body 20 may be configured in any suitable length to fulfill a desired need or function. Further, the pulling cap body 20 may be of any suitable width, and may have a width or diameter of any suitable size, depending on the embodiment.

FIGS. 2-4 depict an embodiment of the pulling cap body 20 comprising more than one opening 22. In this embodiment, cap end 24 can comprise three openings 22 defined therethrough, but it will be appreciated that cap end 24 can comprise alternate numbers of opening 22. Further in this embodiment, three openings 22 may be defined in cap end 24 in varying locations, but will be generally placed and spaced apart such that they may align with three microducts 6 located inside pulling cap body 20. Accordingly, in an embodiment with two openings 22 located in cap end 24, the two openings 22 may align with two microducts 6 located inside pulling cap body 20.

As such, pulling cap body 20 does not require an opening 22 or carrot screw 60 for each individual microduct 6 in bundle 2. In a microduct bundle 2 comprising a plurality of microducts 6, as carrot screw 60 threads through a microduct 6 and presses the microduct 6 against cap end 24, the remaining microducts 6 in bundle 2 may follow, and also be pressed against cap end 24. As the microducts 6 in the bundle 2 are all connected, when one microduct 6 is pulled in one direction, the remaining microducts 6 may follow. When secured to cap end 24, microducts 6 without a carrot screw 60 are still protected from water, debris, and contaminants, as a seal is created when pressed against the cap end 24.

Depending on the embodiment, pulling device 10 may optionally include at least one guide rod 26, which may be selectively and detachably connected, to aid in alignment of pulling cap body 20 and/or provide additional security and protection to microduct 6. As illustrated in the figures, guide rod 26 may be connected to cap end 24 and extend down into the hollow interior of pulling cap body 20. Guide rod 26 may be either molded or formed as a unitary component with cap end 24, or it can be added to cap end 24 after manufacturing. Guide rod 26 may include ridges, protrusions, or threads formed thereon or may have grooves or other indentions defined therein. For example, as illustrated in FIGS. 2 and 3, guide rod 26 can comprise one threaded end, and may be threaded into a threaded guide rod opening 28 defined in cap end 24. The length of guide rod 26 can vary, but in one embodiment, guide rod 26 is the same length as the pulling cap body 20. The positioning of guide rod 26 may further vary, depending on the embodiment, but may generally be positioned such that it aligns with one or more microducts 6 located in the interior of pulling cap body 20.

Guide rod 26 can be used as a guiding instrument, by inserting into the end of one or more microducts 6, aligning pulling cap body 20 in alignment. Guide rod 26 may have a diameter small enough so that it may be inserted into a microduct 6 located in the pulling cap body 20. The guide rod 26 can keep pulling cap body 20 aligned when attached to microduct 6. As depicted in FIGS. 2 and 3, in an embodiment designed for a 7-way microduct, guide rod 26 serves an additional purpose. In this embodiment, guide rod 26 fills the space in the center microduct 6 to keep the center microduct 6 from compressing when the carrot screws 60 are threaded into surrounding microducts 6. Guide rod 26 threading enhances grip and coupling stability. It will be appreciated that pulling device 10 can comprise more than one guide rod 26, and could comprise a plurality of guide rods 26, up to and even exceeding the number of microducts 6 secured to the pulling device 10.

Pulling device 10 may include any suitable means for coupling to a drilling machine or other pulling device (not shown). In one embodiment, pulling device 10 may include at least one pulling arm or support 30, adapted for facilitating the connection of a removable pulling apparatus 50. In one embodiment and as illustrated in FIGS. 2-4, pulling cap body 20 may include two pulling supports 30. Pulling supports 30 may be forged or machined in the construction of the pulling cap body 20 or they may be added to the pulling cap body 20 through a fastening method such as, but not limited to welding or screwing. Pulling supports 30 may vary in size depending on the embodiment but as depicted in FIGS. 2 and 3, pulling supports 30 may extend beyond cap end 24 of the pulling cap body 20 to form a clevis-type structure. Pulling supports 30 may be modified to be of different lengths in other embodiments. The width of pulling supports 30 may also vary in size depending on the embodiment. Additionally, the width of pulling supports 30 may vary based on the embodiment, and can be consistent in width, or it may narrow, or it may broaden.

Each pulling support 30 can have an aperture, opening, or hole 32 defined therethrough. In the illustrated embodiment, one of the holes 32A may be unthreaded and the other hole, threaded hole 32B, may be threaded. The size of hole 32A and threaded hole 32B may vary based on the embodiment, but both hole 32A and threaded hole 32B will be of a size or diameter large enough for a support bolt 94, or other supporting device, to pass through the holes. Hole 32A and threaded hole 32B may be large enough to accept a bolt 94, pin, other elongated member or fastening device therethrough. In such an embodiment, the bolt 94 can pass through hole 32A and can thread into threaded hole 32B. In other embodiments of the invention, a different support structure may be used as well as a different fastening method. Pulling supports 30 may be constructed from any suitable material including, but not limited to, steel, hardened steel, aluminum, plastic, heat dipped steel, or other suitable materials.

Pulling device 10 may optionally include a pulling apparatus 50 or other means adapted for coupling the pulling device 10 with a drilling or pulling device (not shown). In one embodiment as depicted in FIGS. 2 and 3, pulling apparatus 50 may function as a link between pulling cap body 20 and the external pulling device. In this embodiment, pulling apparatus 50 can be connected to pulling cap body 20 via a pin or bolt 94, passing through pulling supports 30. Such connection may permit pulling apparatus 50 to rotate or pivot relative to pulling cap body 20.

Pulling apparatus 50 can be made at an appropriate thickness to provide the strength to withstand the force required to pull microduct(s) 6 in all applications. In the illustrated embodiment, pulling apparatus 50 can be designed as a pulling "V," and can be generally shaped to resemble the letter V. It can be appreciated that pulling apparatus 50 can be designed in other shapes and configurations, and still perform in substantially the same manner. The pulling apparatus 50 may include apertures, holes, or pulling apparatus openings 52 through which a bolt 94, pin, or other connection device may pass through. As depicted in FIGS. 2 and 3, pulling apparatus 50 can comprise two pulling apparatus openings 52, located at opposing ends of pulling apparatus 50.

Pulling apparatus 50 may have a length that is sufficient to position the pulling apparatus 50 on either side of the pulling supports 30, such that pulling apparatus openings 52 of pulling apparatus 50 line up with hole 32A and threaded hole 32B of pulling support 30, thereby creating one continuous opening. Pulling apparatus openings 52 may be unthreaded and can have a diameter suitable for pulling apparatus 50 to accommodate a threaded bolt 94 or other suitable structure suitable for withstanding the force of pulling microducts 6 in underground, aerial existing pipe, or any other suitable application wherein microducts 6 may be pulled. The diameter of the pulling apparatus openings 52 may be generally the same diameter of hole 32A and the threaded hole 32B of the pulling supports 30. A bolt 94 or other similar pin or fastener can connect the pulling cap body 20 to pulling apparatus 50. Bolt 94 or similar fastening device may be secured by either threading bolt 94 through the threaded hole 32B in the pulling support 30 or any other suitable method of securing the bolt 94 or similar fastening device. Bolt 94 or similar fastening device may be secured using alternate methods, including but not limited to a clamp, a pin, or other suitable methods. When attached to pulling cap body 20, pulling apparatus 50 may then be attached to a drilling or pulling device to install microduct(s) 6.

Pulling device 10 may further optionally include a pliable rubber seal 40 for added protection of microducts 6. Rubber seal 40 may be pressed up against cap end 24 in the interior of pulling cap body 20 in order to prevent direct contact between the microducts 6 and the cap end 24. The size and shape of rubber seal 40, may vary depending on the size and shape of pulling cap body 20. As illustrated in FIG. 2, rubber seal 40 may comprise at least one opening, aperture, or seal carrot opening 42 defined therethrough, in a matching number and placement of opening 22 in cap end 24 for carrot screws 60 to pass through. Further, in an embodiment that comprises a guide rod 26, rubber seal 40 may also optionally comprise at least one additional opening, or seal guide rod opening 44 such that guide rod 26 may pass through rubber seal 40. Rubber seal 40 may optionally be made of other material, including but not limited to plastic, textile, or other known materials.

Figure 5:
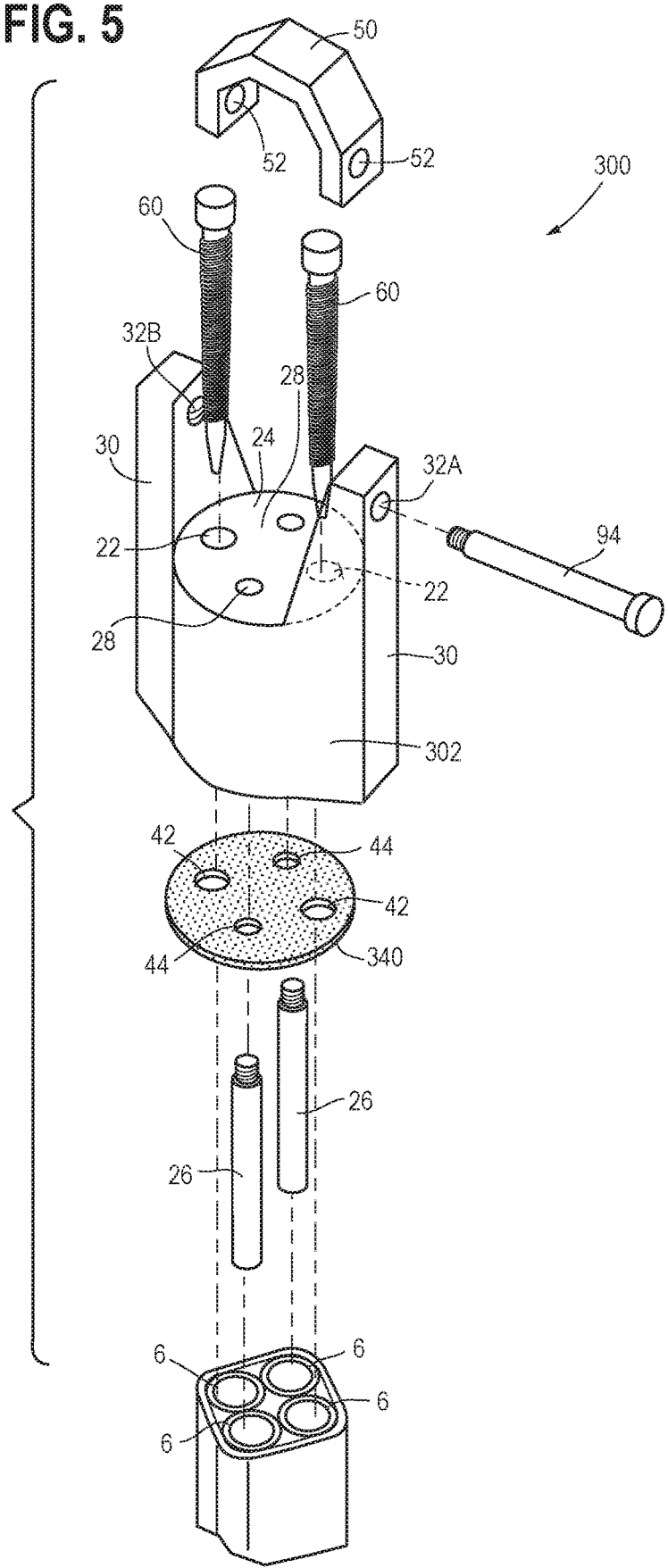
FIG. 5 is an exploded view of a pulling device for use with a 4-way microduct bundle in accordance with one embodiment of the present invention.

As described herein, pulling device 10 may be designed and adapted for use with multiple microduct 6 configurations, designs, and numbers. One such alternate and non-limiting embodiment, a 4-way round pulling device 300 is illustrated in FIG. 5. In this embodiment, a 4-way round pulling cap body 302 can be used with a 4-way microduct bundle. 4-way round pull cap body 302 can comprise two opening 22 for two carrot screws 60 and two threaded guide rod openings 28 for two guide rods 26 in cap end 24. Further, 4-way round pulling device 300 can comprise two guide rods 26, as illustrated in FIG. 5. In one embodiment of 4-way round pulling device 300, a matching rubber seal 340 can be utilized. Rubber seal 340 may be adapted to correspond to the configuration of 4-way round pulling cap body 302, by comprising two seal carrot openings 42 that can align with carrot openings 22 and two seal guide rod openings 44 that can align with two guide rods 26 in cap end 24.

Figure 6:
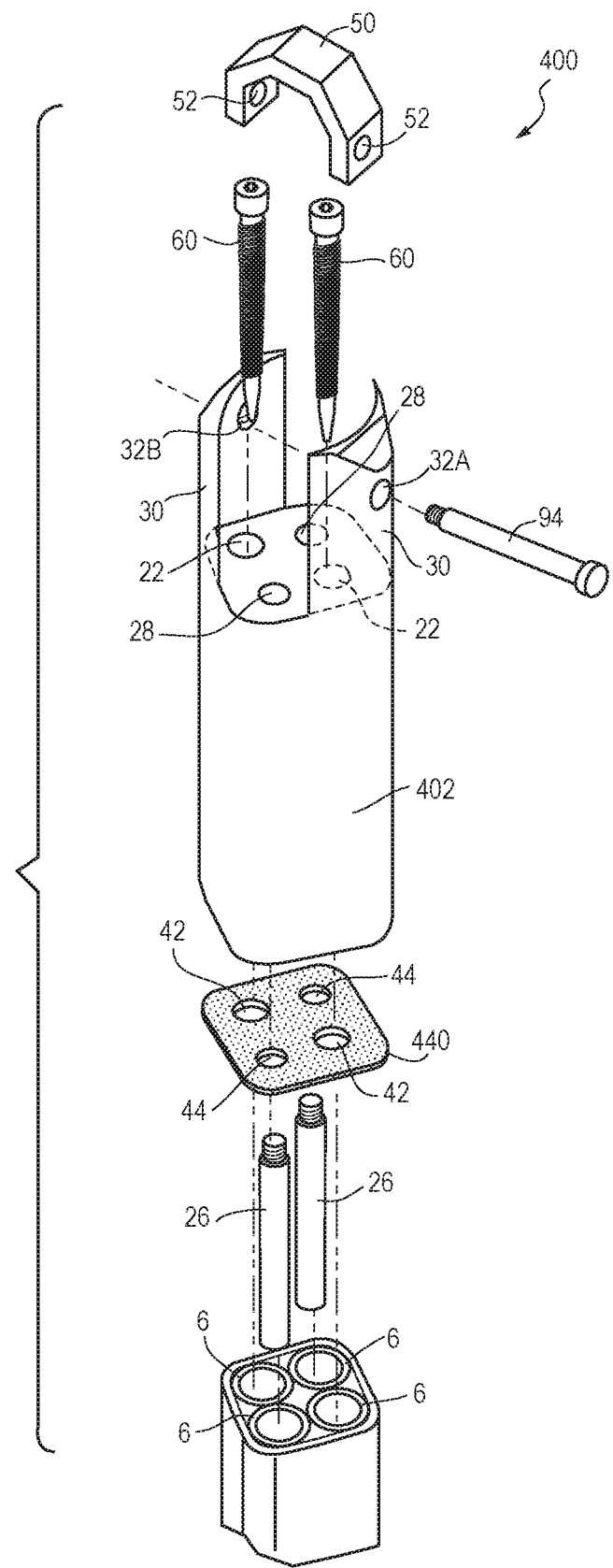
FIG. 6 is an exploded view of a pulling device for use with a 4-way microduct bundle in accordance with another embodiment of the present invention.

A second alternate and non-limiting embodiment, a 4-way square pulling device 400 is illustrated in FIG. 6. This embodiment can also be used with a 4-way microduct bundle, but comprises a 4-way square pulling cap body 402. In one embodiment of 4-way square pulling device 400, a square pliable rubber seal 440 may also be used, matching the size and shape of 4-way square pulling cap body 402. As with the first alternate embodiment as described herein, 4-way square pulling cap body 402 may also comprise two carrot openings 22 in cap end 24 for two carrot screws 60 and two threaded guide rod openings 28 for two guide rods 26.

From the foregoing, it will be seen that this invention is one well adapted to attain all the ends and objects hereinabove set forth together with other advantages which are inherent to the structure and method. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A device for installing bundles or conduits containing fiber optic material, the device comprising:
    a body having an interior wall defining an interior void space for accommodating at least one conduit therein; and
    at least one fastening component for engaging and securing the at least one conduit at least partially within the interior void space of the body, wherein at least a portion of the at least one fastening component is configured to be received within the at least one conduit and engage an interior surface of the at least one conduit;
    wherein the device is configured to be connected to a pulling mechanism.

2. The device of claim 1, wherein one end of the body is open and an opposing end of the body is generally closed.

3. The device of claim 2 further comprising at least one opening defined through the closed end of the body for receiving the at least one fastening component therethrough.

4. The device of claim 1, wherein the at least one fastening component comprises a tapered shaft having at least one of ridges, protrusions, indentions and threads.

5. The device of claim 4, wherein the at least one fastening component causes the at least one conduit to expand.

6. The device of claim 5, wherein the at least one fastening component causes a jacket surrounding the at least one conduit to expand and engage the interior wall of the body.

7. The device of claim 1, wherein the interior wall of the body comprises at least one of ridges, protrusions, indentions and threads.

8. The device of claim 1 further comprising a seal member adapted for placement within the void space of the body between a free end of the at least one conduit and a closed end of the body.

9. The device of claim 8, wherein the at least one fastening component is adapted for pulling the at least one conduit against the seal member, securing the at least one conduit in place within the body.

10. The device of claim 8, wherein the seal member includes at least one opening defined therein for receiving the at least one fastening component therethrough.

11. The device of claim 1 further comprising a guide rod within the interior void space of the body for aligning and providing additional gripping stability to a microduct having the at least one conduit within the interior void space of the body;

wherein the at least one conduit comprises first and second conduits; and wherein the guide rod engages the first conduit and the fastening component engages the second conduit.

12. The device of claim 1 further comprising a pulling apparatus adapted for coupling the device to the pulling mechanism.

13. A method for pulling bundles or conduits containing fiber optic material through a subterranean pathway, the method comprising the steps of:

providing a device comprising:

a body having an interior wall defining an interior void space for accommodating at least one conduit therein; and at least one fastening component for engaging and securing the at least one conduit at least partially within the interior void space of the body, wherein at least a portion of the at least one fastening component is received within the at least one conduit and engages an interior surface of the at least one conduit;

engaging the at least one conduit with the at least one fastening component and at least partially securing the at least one conduit within the interior void space of the body;

coupling the device to a pulling machine; and pulling the device through the subterranean pathway.

14. The device of claim 7, wherein the at least one of ridges, protrusions, indentions and threads of the interior wall of the body are adapted for engaging and securing the conduit as the conduit is inserted into the body.

15. A device for installing cables or conduits, the device comprising:

a body having an interior wall defining an interior void space for accommodating at least a first conduit and a second conduit therein;

at least one guide rod within the interior void space of the body adapted for aligning with and being inserted into the first conduit; and at least one fastening component for engaging and securing the second conduit at least partially within the interior void space of the body;

wherein the device is configured to be connected to a pulling mechanis, wherein the at least one guide rod is generally smooth, and wherein the at least one fastening component comprises a shaft having at least one of ridges, protrusions, indentions and threads.

* * * * *